US011005882B1

(12) United States Patent
Song et al.

(10) Patent No.: US 11,005,882 B1
(45) Date of Patent: May 11, 2021

(54) REPUTATION-BASED TRANSACTION SECURITY

(71) Applicant: SYMANTEC CORPORATION, Mountain View, CA (US)

(72) Inventors: Qubo Song, Playa Vista, CA (US); Joe H. Chen, Manhattan Beach, CA (US)

(73) Assignee: NORTONLIFELOCK INC., Tempe, AZ (US)

(*) Notice: Subject to any disclaimer, the term of this patent is extended or adjusted under 35 U.S.C. 154(b) by 93 days.

(21) Appl. No.: 16/222,240

(22) Filed: Dec. 17, 2018

(51) Int. Cl.
H04L 29/06 (2006.01)
G06Q 20/32 (2012.01)
H04W 12/122 (2021.01)
G06Q 20/20 (2012.01)

(52) U.S. Cl.
CPC ....... H04L 63/1441 (2013.01); G06Q 20/206 (2013.01); G06Q 20/322 (2013.01); G06Q 20/3276 (2013.01); H04W 12/122 (2021.01)

(58) Field of Classification Search
CPC ............ G06Q 20/206; G06Q 20/322; G06Q 20/3276; H04L 63/1441; H04W 12/122
See application file for complete search history.

(56) References Cited

U.S. PATENT DOCUMENTS 7,458,510 B1 * 12/2008 Zhou ...................... G06Q 20/18 235/379
2009/0328209 A1 * 12/2009 Nachenberg ........ H04L 63/1408 726/22
2013/0239185 A1 * 9/2013 Orttung ................... H04L 63/08 726/5
2013/0254829 A1 * 9/2013 Jakubowski ............ G06F 21/53 726/1
2014/0173686 A1 * 6/2014 Kgil ...................... H04L 63/205 726/1
2014/0337243 A1 * 11/2014 Dutt ..................... G06Q 50/265 705/325
2015/0149357 A1 * 5/2015 Ioannidis ........... G06Q 20/3224 705/44
2016/0019613 A1 * 1/2016 Roof ................. G06F 16/24578 705/26.35

(Continued)

OTHER PUBLICATIONS

Vlasselaer et al., "APATE: A novel approach for automated credit card transaction fraud detection using network-based extensions", May 2015, pp. 38-48 (Year: 2015).*

Primary Examiner — Thaddeus J Plecha
(74) Attorney, Agent, or Firm — Maschoff Brennan

(57) ABSTRACT

Reputation-based transaction security. In one embodiment, a method for reputation-based transaction security may include obtaining data regarding a user device associated with a first party; obtaining data regarding an intended second party, the user device being used in a transaction between the first party and the intended second party; calculating a reputation score based on the data obtained regarding the user device and the intended second party; determining a likelihood that resources related to the transaction will be received by the intended second party based on determining that the reputation score satisfies a pre-determined threshold; and automatically initiating a remedial action to the user device based on determining the likelihood that resources related to the transaction will be received by the intended second party.

19 Claims, 3 Drawing Sheets

(56) References Cited

U.S. PATENT DOCUMENTS

| | | | |
|---|---|---|---|
| 2016/0036833 A1* | 2/2016 | Ardeli | H04L 63/101 726/22 |
| 2016/0379182 A1* | 12/2016 | Sheng | G06Q 20/02 705/44 |
| 2018/0260833 A1* | 9/2018 | Khan | G06F 3/04842 |
| 2018/0374151 A1* | 12/2018 | Joshi | G06Q 40/00 |
| 2019/0034903 A1* | 1/2019 | Arora | G07G 3/006 |

* cited by examiner

REPUTATION-BASED TRANSACTION SECURITY

BACKGROUND

Many technologies are in place today that provide security to mobile device operation and communications. For example, mobile devices may store sensitive information, may transmit confidential information, and may otherwise contain information about a user of the mobile device or other users that is meant to be kept out of the hands of malicious actors. Mobile devices are increasingly being used as transactional tools to receive and make remittances for goods and services. Existing mobile transaction security solutions may be classified as "environmental security," and may be implemented to intercept network communication anomalies like Man-in-the-Middle eavesdropping, Address Resolution Protocol (ARP) spoofing, etc. More specifically, existing mobile transaction security solutions may determine, for example, whether a malicious party is hacking a communication connection (e.g., WiFi connection), or sniffing a user's bank account and password. Existing solutions, however, do not determine whether an economic exchange is being received by a reputable party.

The subject matter claimed herein is not limited to embodiments that solve any disadvantages or that operate only in environments such as those described above; rather, this background is only provided to illustrate one example technology area where some embodiments described herein may be practiced.

SUMMARY

In one embodiment, a computer-implemented method for reputation-based transaction security may be performed, at least in part, by a computing device comprising one or more processors. The method may include obtaining data regarding a user device associated with a first party; obtaining data regarding an intended second party, the user device being used in a transaction between the first party and the intended second party; calculating a reputation score based on the data obtained regarding the user device and the intended second party; determining a likelihood that resources related to the transaction will be received by the intended second party based on determining that the reputation score satisfies a pre-determined threshold; and automatically initiating a remedial action to the user device based on determining the likelihood that resources related to the transaction will be received by the intended second party.

In some embodiments, obtaining data regarding the user device may include obtaining location information of the user device with respect to a location of the intended second party, historical transaction data initiated by the user device, or a combination thereof. In some embodiments, obtaining location information of a point-of-sale computer device associated with the intended second party, historical transaction data associated with the intended second party, a server identification number (ID) associated with the intended second party, a server ID associated with the transaction, a vendor ID associated with the intended second party, a vendor ID associated with the transaction, a web address associated with the intended second party, a web address associated with the transaction, or a combination thereof.

In some embodiments, calculating the reputation score may include applying a weighted value to each of the datum obtained regarding the user device, the intended second party, or a combination thereof.

In some embodiments, determining that the reputation score satisfies a pre-determined threshold may include determining that the reputation score satisfies the pre-determined threshold established by an administrator and/or that the reputation score satisfies the pre-determined threshold established by the first party.

In some embodiments, automatically initiating the remedial action to the user device may include issuing a notification to the first party on the user device, blocking the transaction, severing a network connection between the user device and a computing device associated with the intended second party to prevent the transaction, and/or flagging the intended second party and storing an indication of flagging the intended second party in a database accessible by the user device.

In some embodiments, the method may further include initiating the transaction with the intended recipient by initiating a communication over a network connection with the intended recipient. Initiating the communication may further include initiating the communication by way of a short-range wireless communication between the user device and the intended recipient, scanning, with a camera coupled to the user device, an optical machine-readable image at a location associated with the intended recipient. In some embodiments, the short-range wireless communication may be a near-field communication or a Bluetooth communication. In some embodiments, the optical machine-readable image may be a barcode or a QR code.

Also, in some embodiments, a computer system may include a processor, a memory in communication with the processor, instructions stored in the memory that, when executed by the processor, causes the processor to perform a method for reputation-based transaction security.

Also, in some embodiments, one or more non-transitory computer-readable media may include one or more computer-readable instructions that, when executed by one or more computing devices, cause the one or more computing devices to perform a method for reputation-based transaction security.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Transactional security, including economic exchange security, may be an overall important aspect of a mobile device and communication security. In some cases, there are protocols in place to secure transactions that have already taken place and communication of the transaction details between one party and another. For example, there are protocols designed to determine if the transaction between a buyer and a seller is over a secure channel. Malicious actors may try to intercept private information using tools such as network scanning, Man-in-the-middle attacks, WiFi connection hacking, phishing for bank account information and passwords, etc.

Some embodiments described herein may enable reputation-based transaction security. In particular, although malicious anomalies may be detected in the communication channels of a transaction, mobile transactions and remittances are increasingly becoming consumer-to-consumer, and thus there may be a centralized platform where the connection is frequently, if not always, protected by encryption schemes (e.g., public key infrastructure (PKI)). Furthermore, due to the changing landscape of purchasing, anyone can be a merchant or a buyer, and thus either party could be an imposter or a malicious actor. Thus, some embodiments may include a method of determining the reputation of the receiving end of a transaction to determine whether a transaction is being sent to the intended party and that the intended party is reputable.

Figure 1:
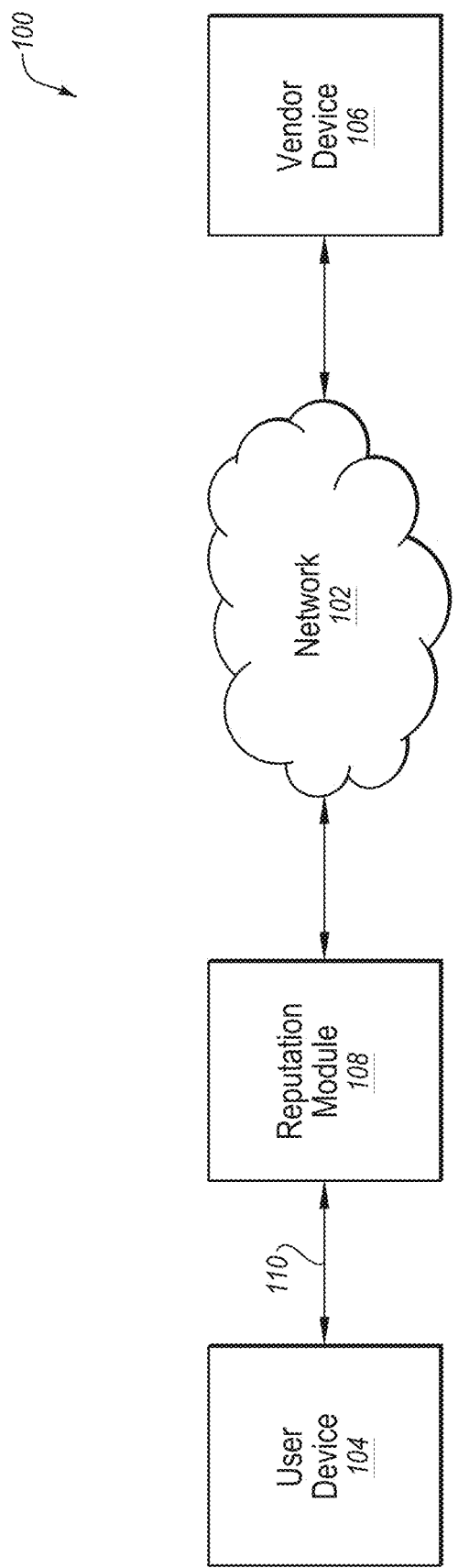
FIG. 1 illustrates an example system configured for reputation-based transaction security.

Turning to the figures, FIG. 1 illustrates an example system configured for reputation-based transaction security. The system 100 may include a network 102, a user device 104, a vendor device 106, and a reputation module 108. In some embodiments, the reputation module 108 may execute on a standalone device that communicates with the user device 104 and the vendor device 106. In other embodiments, however, the reputation module 108 may be part of the user device 104 and/or the vendor device 106. Although the vendor device 106 may be associated with a merchant, a vendor, a service provider, etc. the vendor device 106 may be any computing device capable of executing the embodiments described herein, including a server, another user device, a device associated with a bank or another financial institution, etc.

In some embodiments, the network 102 may be configured to communicatively couple the user device 104, the vendor device 106, and the reputation module 108 by way of communication links 110. Although not specifically shown in FIG. 1, user device 104 may directly communicate with vendor device 106 by way of communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
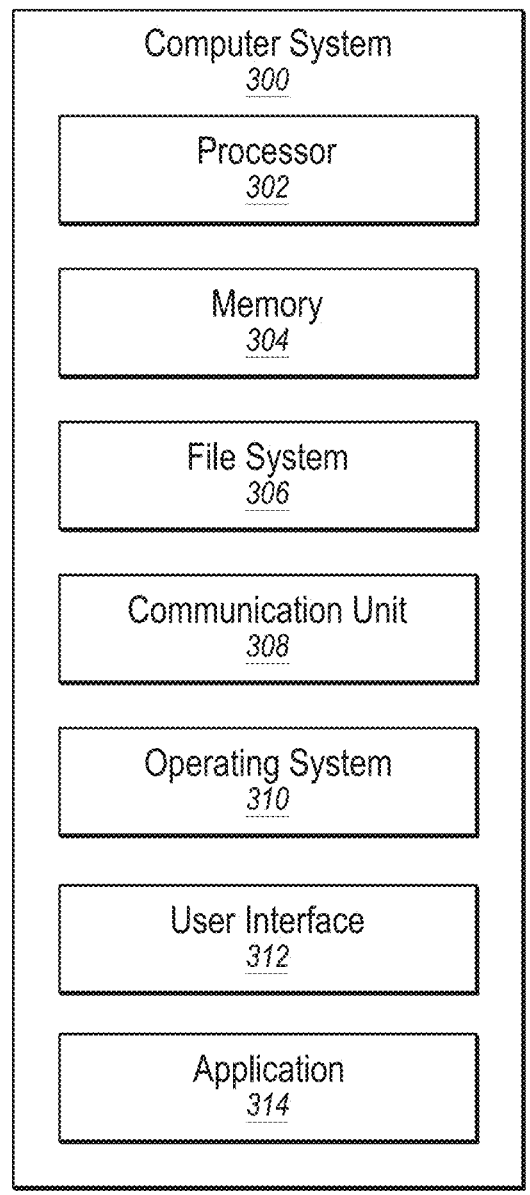
FIG. 3 illustrates an example computer system that may be employed in reputation-based transaction security.

In some embodiments, the user device 104 may be any computer system capable of communicating over the network 102 and capable of at least engaging in a remittance and purchase transaction with another party, examples of which are disclosed herein in connection with the computer system 300 of FIG. 3. In one embodiment, the user device 104 may be running a transaction security application of which the reputation module 108 may be a part.

Similarly, in some embodiments, the vendor device 106 may be any computer system capable of communicating over the network 102 and capable of receiving transaction information, or payment information, examples of which are disclosed herein in connection with the computer system 300 of FIG. 3.

In some embodiments, the reputation module 108 may be implemented in conjunction with any application including, but not limited to, Symantec's Security Technology and Response (STAR) technology.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the reputation module 108 may execute on the user device 104, the vendor device 106, or may execute on another device not illustrated in FIG. 1.

Many purchases may be paid for using a mobile device to initiate and complete the economic exchange portion of the transaction. For example, a user may use his or her mobile device to interact with a mobile payment and digital wallet platform such as the APPLE PAY® service by Apple Inc. and/or the GOOGLE PAY® service by Google LLC. Remittances may be made by the user interacting with a camera associated with his or her mobile device to scan a bar code associated with the transaction, or scan a Quick Response (QR) code. In addition, the user's mobile device may contain technology, such as NEAR-FIELD COMMUNICATION™ (NFC), or BLUETOOTH® technology. In the case of NFC or BLUETOOTH technology, the transaction may initiate when the user is located within a pre-determined distance of the recipient's hardware. Other remittance options may include swiping a credit card through a dongle attached to a receiving party's mobile device (e.g., smartphone, tablet, etc.). An example dongle device may include the SQUARE® device by Square, Inc. In some embodiments, the user's mobile device may be a smartphone, a tablet, a wearable device such as a smartwatch, etc.

Regardless of how the transaction is initiated between the user (e.g., the buyer) and the recipient (e.g., the seller), the user may like to be certain that the money being transferred is being transferred to the intended party (i.e., from a specific buyer to a specific seller). In some embodiments, the user may have access to a protocol that determines whether the connection between the user and the recipient is secure; however, the user may not know that the secure communication is being communicated to the intended recipient. For example, a vendor may present a bar code or a QR code for a user to scan with the mobile device. Without the vendor's knowledge, however, a malicious actor may print a fake bar code or QR code and paste it over the real code, therefore diverting the transaction to a malicious actor. In an additional or alternative embodiment, a malicious actor may replace a hardware point-of-sale device with an imposter device in order to direct the transaction to a different location. Other methods of misdirection are contemplated and are not limited to the discussed examples.

Reputation module 108 may be configured to determine a reputation score for a merchant (or more generally, for the recipient of a monetary transaction) and to notify the user there may be an issue. In an additional or alternative embodiment, the reputation module 108 may be configured to act on behalf of the user to prevent or flag a potential transaction that has been determined to have a lower reputation.

In some embodiments, reputation module 108 may determine a reputation score of a vendor based on a variety of data. A plethora of information may be obtained regarding the transaction at hand, as well as information associated with each of the user device 104 and the vendor device 106. Based on a collection of data and analysis of the data, a real-time reputation score may be determined for a vendor. In one embodiment, the user may be made aware of the reputation score before the transaction is complete, and thus the user may be enabled to make a decision as to whether to safely proceed. In an alternative or additional embodiment, a set of thresholds may establish a baseline level (or multiple levels) of acceptable reputation scores. If a reputation score for a vendor does not satisfy the threshold, the reputation module 108 may alert the user or may automatically take some other security-related action. For example, the reputation module 108 may flag the transaction, so that if there is a problem or dispute later, there is timely evidence that there was an anomaly with the transaction. The transaction may be flagged so that if the user decides to go through with the transaction (or doesn't), the user will be alerted at a future time that the vendor has been flagged. For example, if the vendor has been flagged before, the user may receive an alert or notification when the reputation module 108 determines the user is within a pre-determined distance of the vendor. The alert or notification may inform the user of the vendor's reputation score at the last visit. In an additional or alternative embodiment, a vendor may be flagged, but over time, the reputation score may be increased or decreased. Thus, if the reputation module 108 determines the user is within the pre-determined distance of the vendor, the user may receive an alert or notification with an updated reputation score.

Data may be obtained from the user's mobile device regarding the user, the mobile device, and/or the current situation regarding the user and/or the mobile device. Data may be obtained from the vendor, including information regarding a hardware and/or mobile device associated with the vendor. In one embodiment, the mobile device may be the same device as the user device 104.

For example, with regard to the user's mobile device, the reputation module 108 may obtain the current location of the user by determining the current location of the mobile device. Global Positioning System (GPS) location or other geolocation methods may be used to determine the current location of the user and the mobile device. Location may be returned within a three-dimensional space, and thus may include a latitude/longitude direction, as well as an altitude, thus providing a high specific location. The specific location may be of importance because many vendors may be located within a relatively small space. Furthermore, many vendors may be people, where each person is located at the same latitude and longitude, but on different floors in a building, and thus at different altitudes. In some embodiments, an accurate location of the mobile device may be determinable within 10 meters or fewer from a registered or known location of a vendor.

In an additional or alternative embodiment, the reputation module 108 may collect location data by utilizing an Application Programming Interface (API) provided by various mobile device operating system software development kits (SDKs).

In some embodiments, data regarding past transactions made using the mobile device may be stored in a local or remote database and may be obtained by the reputation module 108. Past transaction data may include, but is not limited to, the vendors purchased from, the number of purchases, the types of purchases, the number of items purchased, prices, the method of remittance (e.g., using credit, debit, digital currency, etc.).

In some embodiments, the amount of money involved in a transaction may also be considered in the reputation score of the vendor. For example, if the vendor is a gas station, and the example median amount spent per transaction is $40, then a transaction of $400 would indicate a potential issue. There could be a threshold, or multiple thresholds. Amounts could be weighted as they affect the reputation score. Thresholds could be calculated based on transaction amounts (e.g., averages, medians), or could be pre-determined by an administrator. Other information regarding the user and/or the mobile device may be obtained from the mobile device, and the information is not limited to the above examples.

Information regarding the vendor and the transaction may also be obtained by the reputation module 108. For example, as with the mobile device, the location of the vendor may be obtained. In one example, the location of a bar code/QR code/other scannable code that is to be scanned by the mobile device in order to make a transaction may be determined based on determining the location of the mobile device at the time of the transaction. In an additional or alternative embodiment, the location of the bar code and/or QR code and/or other scannable code may be determined before the transaction is initiated and based on other data gathered regarding the potential transaction. For example, if the user pulls up a transaction application on the user's mobile device, and the mobile device is determined to be in a location for a pre-determined period of time that likely indicates a purchase is to be made, then a vendor's location may be determined.

In an alternative or additional embodiment, a vendor may register its address with the security application executing the reputation module 108. Thus, the reputation module 108 may be able to compare the registered address with the location determined at the time of the transaction. If the address is the same, or the location is close within a pre-determined range, then the vendor is more likely to be more reputable. If the address is unknown or different, the vendor is likely to be less reputable.

In an alternative or additional embodiment, the location of the computing device receiving the remittance from the mobile user device 104 may be determined. For example, a vendor may be using APPLE PAY® and/or GOOGLE PAY®, and the location of the point-of-sale device associated with these options may be determined. In one embodiment, the location of the point-of-sale devices may be determined due to the fact the point-of-sale devices are connected to wired and/or wireless communications through a network.

In an additional or alternative embodiment, information about the vendor may be obtained, such as a merchant identification number (Merchant ID), a server name, a transaction ID, an IP address, a security certificate, a physical address, etc. For example, if the transaction is a purchase made at Target® department store, and the transaction communication is associated with the web address "www.target.com", the transaction is more likely reputable.

In one embodiment, information about the vendor may be obtained through an analysis of network traffic. In an additional or alternative embodiment, information about the vendor may be obtained from a transaction application (e.g., APPLE PAY, GOOGLE PAY, SQUARE, a bank application, etc.) or hardware such as an NFC communication chip.

In an additional or alternative embodiment, information regarding the vendor may include how many successful and/or trustworthy transactions have occurred over a pre-determined period of time. For example, if a vendor has had over 50,000 transactions with no indicators of foul play, the vendor is likely to have a higher reputation score. In another embodiment, a vendor may have over 50,000 transactions, but 56% of the last 100 transactions have been flagged with anomalies. In this example, the reputation score of the vendor may be affected by the likelihood that a malicious actor has intervened despite the previous examples of successful and trustworthy transactions. In another embodiment, at a first date, a vendor may only have had 10 transactions, indicating a newer business or perhaps a change of address or name. At this first date, the vendor may therefore have a lower reputation score as there may not be enough data to determine a higher reputation score, or enough time to have established a trustworthy transaction history. However, at a second, later date, the vendor may now have 1000 transactions, with 995 of them seemingly trustworthy, thus increasing the vendor's reputation score. Although these examples provide numbers in the hundreds or thousands, any number of transactions may be considered from one to billions or greater.

In addition, a prevalence of the vendor may be obtained. The prevalence may be obtained by collected metadata for each transaction from each user device 104 (i.e., user mobile device). For example, if the vendor is a food truck with a variable location, but the food truck is determined to be without a pre-determined range of the same 4-5 locations over the course of a year, and over the course of the same year, there are approximately 100,000 transactions at each of the locations, then the food truck demonstrates a measureable prevalence.

Reputation module 108 may thus obtain various information about the user, the mobile device associated with the user, information about the vendor and computing devices associated with the vendor, transaction history of the user and/or the vendor, and then determine a reputation score. In some embodiments, the reputation score may be calculated based on applying pre-determined weights to different types of data. For example, the number of transactions a vendor has experienced may be given a higher weight than the location of the vendor, due to the fact the location may vary (e.g., a food truck vendor). In an additional or alternative embodiment, each datum obtained may have equal weight, or each datum may have a variable weight applied based on other circumstances such as the user, the time of day or year, or other situation.

The user, mobile device, vendor, and transaction data obtained may be analyzed and used to determine a reputation score for a vendor, where the reputation score may be associated with the likelihood that money involved in a transaction is being transmitted to the intended party (i.e., the vendor). In some embodiments, when the user is involved in a transaction or about to be involved in a transaction, the user may be notified on his or her mobile device that there is a potential issue based on the reputation score. For example, in one example embodiment, a reputation score between, and including, 1-100 may be calculated, with 1 being untrustworthy and 100 being very trustworthy. Thresholds may be established (e.g., by an administrator or a user), that provide the user with varying actions and notifications based on the reputation score.

In one embodiment, the user may simply be presented with the score on his or her mobile device at the point of transaction. For example, as the user goes to scan a QR code, the security application running the reputation module 108 may display the reputation score on the display. The reputation score displayed may be the number (e.g., 78), may display text (e.g., "reputable," "very reputable," "questionable," "recent issues," "many reported issues," may display colors or other visual cues (e.g., red if there is a problem, green if the vendor is trustworthy, yellow if there are some questionable transactions), may make an audio sound or vibrate to draw attention to the reputation score, etc.

In an additional or alternative embodiment, the user may be presented with more specification information. For example, the user may receive information that states how many successful and trustworthy transactions have occurred over a pre-determined period of time versus how many questionable transactions there have been. In another example, the user may see the destination location of the last 100 transactions and personally determine that everything looks reputable. In another example, the user may receive a notification that the security application and/or reputation module 108 has not obtained enough data to provide any useful information. In another example, the user may be prompted to end the transaction without giving any additional information. Other alerts and notifications are contemplated and are not limited to those specifically discussed.

In one embodiment, if the reputation score is determined to not satisfy a pre-determined trustworthiness threshold, the transaction may be completely blocked and the user may not be able to complete the purchase. In one embodiment, the user may set the threshold to automatically block the transaction. In an additional or alternative embodiment, the thresholds may be default or may be set by an administrator of the security application. In one embodiment, blocking the transaction may be enabled by locking the user interface on the application running on the mobile device such that the user cannot complete the transaction. In an additional or alternative embodiment, the security application may act to disconnect the network behind the transaction process. In an additional or alternative embodiment, the security application may be paused, but not locked, to provide the user the opportunity to make a decision or gather additional information. In an additional or alternative embodiment, other remedial options may be provided to the user, such as providing the user an option to cancel an already completed transaction within a pre-determined time frame.

In an additional or alternative embodiment, the transaction may be flagged if the reputation score of the vendor did not satisfy a trustworthiness threshold. In this example, the transaction may continue, but the flag may be used by the user if a later investigation is needed, such as during a credit card dispute process.

In one embodiment, the security application may be provided to the client for purchase and/or download from a security company (e.g., SYMANTEC®). The security application may be provided with a network component which may be enabled to validate network traffic generated by third party transaction channels. In an additional or alternative embodiment, the security application may be established and may be registered and maintain vendor information by way of subscription or opt-in procedures. Thus, reputation scores may be provided by a server associated with the developer providing the security application. In an additional or alternative embodiment, the security application may be part of a hardware-based transaction device which may be provided to vendors. For example, a NFC-chip based transaction method. In this embodiment, the hardware-based transaction device may run software to collect transaction information and consolidate the information into a reputation database, from which a reputation score may be determined.

In one embodiment, the reputation module 108 (and/or the security application) may run without user interaction or prompting, and thus may run "in the background," on a user's mobile device. In an additional or alternative embodiment, an application running constantly may result in a quickly drained battery, and thus the reputation module 108 may activate only when a set of conditions are met (e.g., the mobile device is determined to be located at or near a vendor, a transaction appears to be imminent or in process, etc.). In an additional or alternative embodiment, the user may receive notifications and alerts or actions may be taken, only if the user is actively involved in a transaction. In an additional or alternative embodiment, the user may receive notifications and alerts or actions may be taken regardless if a transaction is imminent or in process. For example, a user may receive a notification when passing by or entering a store, as a potential way to warn the user that the transaction may result in an issue.

Figure 2:
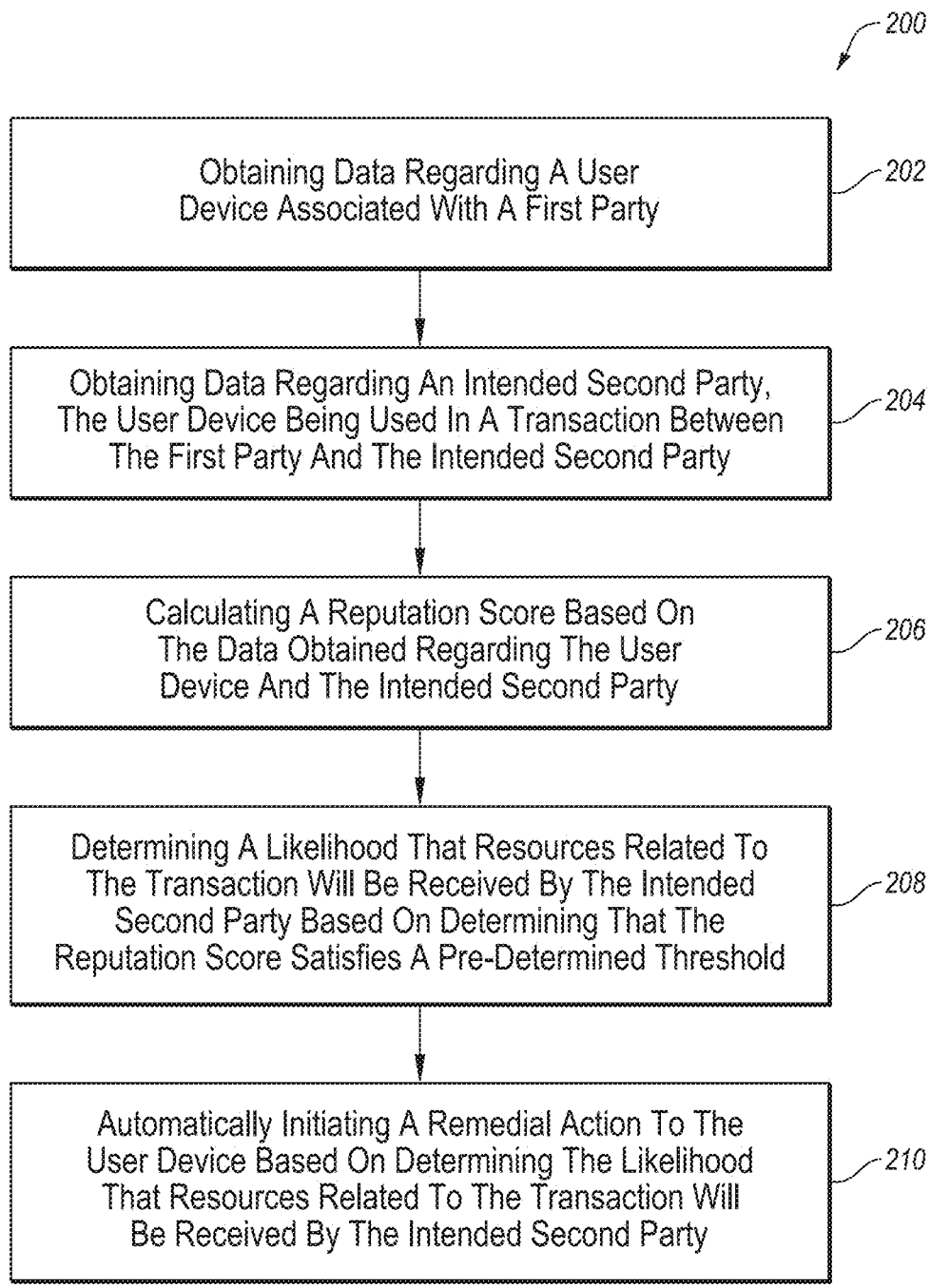
FIG. 2 illustrates a flowchart of an example method for reputation-based transaction security.

FIG. 2 is flowchart of an example method 200 for reputation-based transaction security. The method 200 may be performed, in some embodiments, by a device, module, and/or system, such as by the user device 104, the vendor device 106 and/or the reputation module 108 executing on one of these devices or on another device. In these and other embodiments, the method 200 may be performed by one or more processors based on one or more computer-readable instructions stored on one or more non-transitory computer-readable media. The method 200 will now be described in connection with FIG. 1.

The method 200 may include, at action 202, obtaining data regarding a user device associated with a first party. For example, the user device 104 may collect data regarding the user or transactions made by the user device 104. The data may include, but is not limited to, a current location, historical transactions, etc.

The method 200 may include, at action 204, obtaining data regarding an intended second party, the user device being used in a transaction between the first party and the intended second party. For example, the user device 104 may obtain data associated with the intended recipient through wireless communications with a computing device associated with the intended recipient such as, but not limited to, obtaining location information of a point-of-sale computer device associated with the intended recipient, historical transaction data associated with the intended recipient, a server identification number (ID) associated with the intended recipient, a server ID associated with the economic exchange, a vendor ID associated with the intended recipient, a vendor ID associated with the economic exchange, a web address associated with the intended recipient, a web address associated with the economic exchange, or a combination thereof.

The method 200 may include, at action 206, calculating a reputation score based on the data obtained regarding the user device and the intended second party. For example, the user device 104 may calculate the trustworthiness that the user may have in determining whether the resources associated with the transaction will in fact be transmitted to the intended recipient. Calculating the reputation score may thus be at least partially based on data obtained by the user device 104 about the user device 104 itself, the user, the vendor device 106, and/or the intended recipient.

The method 200 may include, at action 208, determining a likelihood that resources related to the transaction will be received by the intended second party based on determining that the reputation score satisfies a pre-determined threshold. For example, user device 104 may obtain a threshold regarding trustworthiness. If the reputation score falls at or below this threshold, then the intended recipient may be determined to be less trustworthy. In some embodiments, there may be multiple levels of thresholds. In some embodiments, the thresholds may be default, administrator determined, user determined, or determined by another party (e.g., a financial institution).

The method 200 may include, at action 210, automatically initiating a remedial action to the user device based on determining the likelihood that resources related to the transaction will be received by the intended second party. For example, the user device 104 may issue a notification to the user on the user device, block the transaction, sever a network connection between the user device 104 and a computing device associated with the intended recipient, and/or flagging the intended recipient, or some combination thereof.

Although the actions of the method 200 are illustrated in FIG. 2 as discrete actions, various actions may be divided into additional actions, combined into fewer actions, reordered, expanded, or eliminated, depending on the desired implementation.

Further, it is understood that the method 200 may improve the functioning of a computer system itself. Also, the method 200 may improve the technical field of reputation-based transaction security. For example, the user device 104 itself may be improved, and the technical field of reputation-based transaction security may be improved, by the calculation of a reputation score for an intended vendor at action 206 of the method 200, and then by the automatic initiating of a remedial action to the user device 104 based on the reputation score at action 210 of the method 200, which may result in the securing of the user device 104 against a malicious actor who is pretending to be a legitimate vendor.

FIG. 3 illustrates an example computer system that may be employed in reputation-based transaction security. In some embodiments, the computer system 300 may be part of any of the systems or devices described in this disclosure. For example, the computer system 300 may be part of any of the user device 104, the vendor device 106, and/or the reputation module 108 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIG. 2. These computer-executable instructions may be included, for example, in the operating system 310, in one or more modules, such as the reputation module 108 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIG. 2. In some embodiments, the module 314 may be part of the operating system 310 or may be part of an application of the computer system 300, or may be some combination thereof. In some embodiments, the module 314 may function as the reputation module 108 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for reputation-based transaction security, at least a portion of the method being performed by a computing device comprising one or more processors, the method comprising:
   obtaining data regarding a user device associated with a first party;
   obtaining data regarding an intended second party, the data obtained regarding the intended second party comprising a total number of transactions that have occurred between any party and the second party over a pre-determined period of time and a percentage of a pre-determined number of the most recent transactions that have occurred between any party and the second party that are trustworthy transactions, the user device being used in a transaction between the first party and the intended second party;
   calculating a reputation score based on the data obtained regarding the user device and the intended second party;
   determining a likelihood that resources related to the transaction will be received by the intended second party based on determining that the reputation score satisfies a pre-determined threshold; and
   automatically initiating a remedial action to the user device based on determining the likelihood that resources related to the transaction will be received by the intended second party.

2. The method of claim 1, wherein obtaining data regarding the user device further comprises:
   obtaining location information of the user device with respect to a location of the intended second party, historical transaction data initiated by the user device, or a combination thereof.

3. The method of claim 1, wherein obtaining data regarding the intended second party further comprises:
   obtaining location information of a point-of-sale computer device associated with the intended second party, historical transaction data associated with the intended second party, a server identification number (ID) associated with the intended second party, a server ID associated with the transaction, a vendor ID associated with the intended second party, a vendor ID associated with the transaction, a web address associated with the intended second party, a web address associated with the transaction, or a combination thereof.

4. The method of claim 1, wherein calculating the reputation score further comprises:
   applying a weighted value to each of the datum obtained regarding the user device, the intended second party, or a combination thereof.

5. The method of claim 1, wherein determining that the reputation score satisfies a pre-determined threshold further comprises:
   determining that the reputation score satisfies the pre-determined threshold established by an administrator.

6. The method of claim 1, wherein determining that the reputation score satisfies a pre-determined threshold further comprises:
   determining that the reputation score satisfies the pre-determined threshold established by the first party.

7. The method of claim 1, wherein automatically initiating the remedial action to the user device further comprises:
   issuing a notification to the first party on the user device.

8. The method of claim 1, further comprising:
   initiating the transaction with an intended recipient by initiating a communication over a network connection with the intended second party.

9. The method of claim 8, wherein initiating the communication further comprises:
   initiating the communication by way of a short-range wireless communication between the user device and the intended second party.

10. The method of claim 9, wherein the short-range wireless communication is a near-field communication or a Bluetooth communication.

11. The method of claim 8, wherein initiating the communication further comprises:

scanning, with a camera coupled to the user device, an optical machine-readable image at a location associated with the intended second party.

12. The method of claim 11, wherein scanning the optical machine-readable image further comprises:
scanning a barcode or a QR code.

13. The method of claim 1, wherein the transaction is a financial transaction.

14. The method of claim 1, wherein the total number of transactions that have occurred between any party and the second party over the pre-determined period of time comprises the total number of trustworthy transactions that have occurred between any party and the second party over the pre-determined period of time.

15. The method of claim 1, wherein the data obtained regarding the intended second party further comprises a percentage of the total number of transactions that have occurred between any party and the second party over the pre-determined period of time that are trustworthy transactions.

16. A mobile device for reputation-based transaction security, comprising:
a processor;
a memory in electronic communication with the processor; and
instructions stored in the memory, the instructions being executable by the processor to:
obtain data regarding a user device associated with a first party;
obtain data regarding an intended second party, the data obtained regarding the intended second party comprising a total number of transactions that have occurred between any party and the second party over a pre-determined period of time and a percentage of a pre-determined number of the most recent transactions that have occurred between any party and the second party that are trustworthy transactions, the user device being used in a transaction between the first party and the intended second party;
calculate a reputation score based on the data obtained regarding the user device and the intended second party;
determine a likelihood that resources related to the transaction will be received by the intended second party based on determining that the reputation score satisfies a pre-determined threshold; and
automatically initiate a remedial action to the user device based on determining the likelihood that resources related to the transaction will be received by the intended second party.

17. The mobile device of claim 16, wherein when the processor obtains data regarding the user device, the instructions are further executable to:
obtain location information of the user device with respect to a location of an intended recipient, historical transaction data initiated by the user device, or a combination thereof.

18. The mobile device of claim 16, wherein when the processor obtains data regarding the intended second party, the instructions are further executable to:
obtaining location information of a point-of-sale computer device associated with the intended second party, historical transaction data associated with the intended second party, a server identification number (ID) associated with the intended second party, a server ID associated with the transaction, a vendor ID associated with the intended second party, a vendor ID associated with the transaction, a web address associated with the intended second party, a web address associated with the transaction, or a combination thereof.

19. One or more non-transitory computer-readable media comprising one or more computer readable instructions that, when executed by one or more processors of a computing device, cause the computing device to perform a method for reputation-based transaction security, the method comprising:
obtaining data regarding a user device associated with a first party;
obtaining data regarding an intended second party, the data obtained regarding the intended second party comprising a total number of transactions that have occurred between any party and the second party over a pre-determined period of time and a percentage of a pre-determined number of the most recent transactions that have occurred between any party and the second party that are trustworthy transactions, the user device being used in a transaction between the first party and the intended second party;
calculating a reputation score based on the data obtained regarding the user device and the intended second party;
determining a likelihood that resources related to the transaction will be received by the intended second party based on determining that the reputation score satisfies a pre-determined threshold; and
automatically initiating a remedial action to the user device based on determining the likelihood that resources related to the transaction will be received by the intended second party.

* * * * *